United States Patent [19]

Seip et al.

[11] Patent Number: 5,036,751
[45] Date of Patent: Aug. 6, 1991

[54] PROCESS OF PRECISELY ADJUSTING THE LOST TRAVEL OF AT LEAST ONE PISTON IN A MASTER CYLINDER

[75] Inventors: Hermann Seip, Bad Vilbel; Peter Boehm, Friedrichsdorf; Kurt Saalbach, Moerfelden-Walldorf; Klaus Bergelin, Wermelskirchen, all of Fed. Rep. of Germany

[73] Assignee: Alfred Teves GmbH, Frankfurt am Main, Fed. Rep. of Germany

[21] Appl. No.: 358,756

[22] Filed: May 30, 1989

[30] Foreign Application Priority Data

Jun. 10, 1988 [DE] Fed. Rep. of Germany ....... 3819737

[51] Int. Cl.$^5$ .................. F01B 31/14; F15B 15/24
[52] U.S. Cl. ........................ 92/13.4; 92/DIG. 4; 60/533; 60/547.1; 60/562
[58] Field of Search ............... 60/533, 534, 546, 562, 60/588, 547.1; 92/13.4, 13.41, 169.1, 170.1

[56] References Cited

U.S. PATENT DOCUMENTS

| | | | |
|---|---|---|---|
| 2,729,388 | 1/1956 | Ringham | 92/13.41 |
| 4,099,380 | 7/1978 | Cadeddu | 60/588 |
| 4,307,570 | 12/1981 | Yardley | 60/588 |
| 4,400,942 | 8/1983 | Reinartz et al. | 60/547.1 |
| 4,453,380 | 6/1984 | Meynier | 60/547.1 |

FOREIGN PATENT DOCUMENTS 1193372 5/1965 Fed. Rep. of Germany ..... 60/547.1

Primary Examiner—Edward K. Look
Assistant Examiner—Thomas Denion
Attorney, Agent, or Firm—Robert P. Seitter; J. Gordon Lewis

[57] ABSTRACT

A process for the precise adjustment of the lost travel of a piston in a master cylinder. Master cylinders typically include a number of components in spatial series arrangement, with all components having individual tolerances. The individual tolerances regarding the lost travel of the piston or pistons, can combine additively in the master cylinder. The resulting lost travel, hence, is relatively large and varies with individual master cylinders. The process provides that the lost travel of the piston or pistons in the master cylinder can be precisely adjusted and, hence, can be kept very low. The position of the piston or pistons is measured in the condition in which they just seal the associated equilibrium ports. Subsequently, the position of the pistons is calculated in consideration of the desired lost travels and, by adjustment of the force planes acting on the desired point, the resting position of the piston and pistons, respectively, is fixed to the desired distance. Moreover, the process determines, in a simple manner, the position of the piston in which the piston by means of its sleeve, just seals the associated equilibrium port.

9 Claims, 1 Drawing Sheet

PROCESS OF PRECISELY ADJUSTING THE LOST TRAVEL OF AT LEAST ONE PISTON IN A MASTER CYLINDER

BACKGROUND OF THE INVENTION

The present invention relates to a process of precisely adjusting the lost travel of at least one piston in a master cylinder of a pressure fluid-operated brake system for automative vehicles. The master cylinder is the cylinder which is actuated by pedal force or an auxiliary force such as compressed air, a vacuum, or hydraulic pressure. The entire braking operation is initiated and controlled through the master cylinder wherein during application of the brake pedal, the master cylinder piston forces the brake fluid contained in the brake system into the disc brake and the wire cylinder.

Details of operation and design of master cylinders have been described in the "Brake Handbook", 9th edition, published by Bartsch-Verlag, Ottobrunn near Munich, pp. 34 to 73, and particularly pp. 34 to 37 and 52 to 55 thereof.

In order to vent the brake system and to establish a pressure balance between the brake system and the equilibrium reservoir at temperture fluctuations to be established, the cylindrical chamber of the master cylinder is in communication through an equilibrium port with the reservoir. Hence, a pressure build-up in the brake system can take place only if the latter closes the equilibrium port during actuation of the brake piston and, during its continued movement, compresses the remaining fluid within the cylindrical chamber. Consequently, a pedal movement of a predetermined length is required before a brake pressure can develop in the brake system. The distance covered by the piston from its initial position to the point at which it completely seals the equilibrium port during its continued movement, thereby to build up a pressure in the cylindrical chamber, is referred to as lost travel.

Master cylinders in brake systems are composed of a variety of individual components which are all manufactured with required tolerances. As the components frequently are disposed geometrically in series arrangement, the required tolerances sum up such that the total resulting lost travels can assume substantial values. Moreover, the lost travel in each master cylinder can assume a different value so that each brake responds to a different path of actuation.

SUMMARY OF THE INVENTION

According to the present invention, a process of the type in which the lost travel can be adjusted to a fixed predetermined value is provided, with the value being kept on the order, for example, of 1 mm in size.

This problem is solved by the process wherein initially, the piston position is determined in which the sleeve just seals the equilibrium port. Secondly, the distance from a predetermined reference point on the master cylinder at which the required piston force would act upon the piston in that position is measured. Finally, the point of application of the force is displaced in a manner that the distance thereof is a predetermined functional distance relative to a point of reference on the master cylinder. Different measures can, of course, be taken instead provided that they displace the point of application of the force to the suitable distance, which measures include the provision of standardized plugs, screw-threaded spacers and the like.

To determine the position of the piston in simple manner in which the piston just seals the equilibrium port, by way of the sleeve thereof, according to a preferred embodiment, a specific process step is provided. That step permits utilization of the fact that, during sealing of the equilibrium port, a change in pressure is required to take place which is exerted on the cylindrical chamber and/or the path of communication between pressure source and equilibrium port. In this step the pressure either drops during sealing of the equilibrium port when considering the pressure measured in the cylindrical chamber and supplied through the equilibrium port, or rises when considering and measuring, respectively, the pressure escaping through the equilibrium port and exerted on the path of communication between the reservoir and the equilibrium port. In this manner, the actual sealing position of the piston can be readily determined irrespective of the tolerances occurring during manufacture.

For displacing the point of application of the force to a functional distance required for the assembly of the master cylinder into the brake system, particularly a brake force booster, according to another embodiment of the invention, a further process step is provided. According thereto, a plug of suitable dimensions, particularly of a suitable height, is placed into the hollow shaft at the end of the piston, through which the point of application is displaced in a direction opposite the actuation direction of the piston.

Frequently, it also is desirable to employ the process of the invention with master cylinders having two or more pistons. In that case, according to another embodiment of the present invention, employment of additional process steps is provided. This further process includes removing, after the functional distance for the first piston having been established, the piston from the cylinder and in determining the sealing position of a second piston by way of a second equilibrium port. The distance of the plane of force application to the second piston in the sealing position thereof, is subsequently determined in accordance with the measurement effected with the first piston. Thereafter, the distance is recalculated on the condition that the piston, with a predetermined lost travel in the initial position, is placed ahead of the equilibrium port. Finally, the point of force application of the first piston, with respect to the second piston, is so displaced that the first piston is just able to act upon the second piston once both pistons are in the desired resting position with the predetermined lost travel.

According to a further process step, the lost travel for both pistons in the master cylinder is selected equal-sized in order that the two brake circuits, upon actuation of the brake system, respond simultaneously. In the event that a different sequence of response of the individual brake circuits is desired, such an order of sequence in the practice of the present invention, also is readily attainable by a corresponding adjustment of different lost travels in that the shorter lost travel is selected for the piston supplying the first-responding brake circuit. A size of 1 mm has proved to be a suitable length for the lost travel.

For adjusting the plane of force application of the second piston, employment of still further process steps is advisable, with the captivated position of a cup in communication with the first piston and being held through a spring in spaced relation therefrom to the plane of force application to the second piston. Still further steps can be taken as well, including, for example, the provision of spacer plates on the rearward end of the second piston thereby bringing the point of force application, in a direction opposite the actuating direction of the piston, to the desired distance.

BRIEF DESCRIPTION OF THE DRAWING

One embodiment of the present invention will now be described with reference to the accompanying drawing, wherein.

DETAILED DESCRIPTION

The following described embodiment is concerned with a tandem cylinder of the type as described in greater detail, for example, on pp. 52 to 64 of the previously noted Brake Handbook. The cylinder therefore, will, be described only to the extent as required in connection with the process of the present invention.

Figure 1:
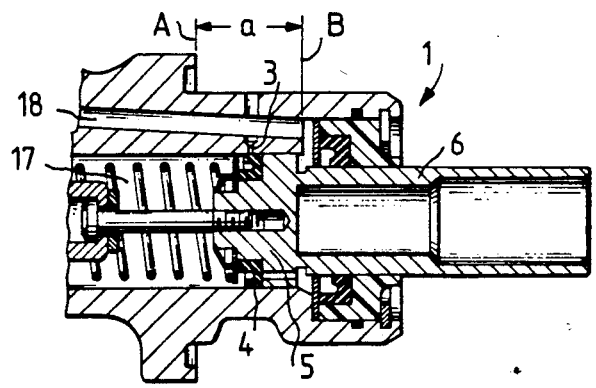
FIG. 1 is a sectional and partly broken-away view of the rear end of a tandem cylinder.

FIG. 1 is a sectional view of the rear portion of a tandem master cylinder 1 the housing 2 of which encloses a cylindrical chamber 17. Guided along the walls of the cylindrical chamber 17 is the surface of a first piston 5 which is commonly referred to as a push rod piston because on the rear side thereof as shown in FIG. 1, at a brake force booster, a push rod acts thereupon. The push rod piston 5 is sealed against the cylindrical chamber 17 through the annular sleeve 4, thereby forming a pressure-tight chamber. The chamber, through a radially extending equilibrium port 3 and a connecting passageway 18, is in communication with the connecting orifice 19 of the equilibrium reservoir not shown in the drawing.

Figure 3:
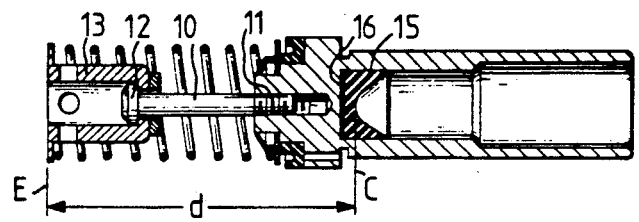
FIG. 3 shows the first piston removed from the tandem cylinder according to FIG. 2, and, FIG. 4 shows the entire tandem cylinder according to FIGS. 1 to 3.

As illustrated in FIGS. 1 and 3, the first piston 5 is so displaced within the cylindrical chamber that it just covers the equilibrium port 3 by its sealing cup or sleeve 4 fixed thereto, thereby sealing the port 3. This position of the piston 5 can be determined with relative ease by evaluating the change in pressure occurring when this state is attained. For example, when measuring a pressure in the connecting passageway 18, which is supplied through the connecting orifice 19, it will be noted that such a pressure rises when sealing the equilibrium port, as no pressure fluid will flow through this port into the cylindrical chamber 17 or will discharge herefrom out of the cylinder. The continued movement of the piston 5 to the left instead will compress the pressure fluid contained in the cylindrical chamber 17 thereby to permit a sealing of the equilibrium port 3. Moreover, it is not absolutely necessary for a fluid such as a brake fluid to be employed for generating the required measuring pressure. The pressure fluctuation occurring by sealing the port, also can be measured by a compressed air source.

Another alternative for measuring the sealing position of the first piston utilizes the fact that the pressure supplied through the equilibrium port, through sealing the same, drops in the cylindrical chamber 17. Accordingly, it is also possible to determine the sealing of the equilibrium port through detection of a pressure drop in the cylindrical chamber. What is important is that the so determined position of the first piston is in no way dependent on the manufacturing tolerances in the manufacture of the master cylinder.

In accordance with the process of the present invention, in the sealing position of the first piston 5, the position of plane B applying force to the bottom of a cup step 6 is measured on the rear end of the rear piston 5. In FIG. 1, the distance between a reference plane A on housing 2 of master cylinder 1 and the force-applying plane B assumes a value a. If the piston 5, in FIG. 1, is now moved to the right by a predetermined lost motion k, the distance between the two planes A and B equals a+k. Consequently, if the lost motion k=1 mm, the distance between A and B will a+1.

Figure 4:
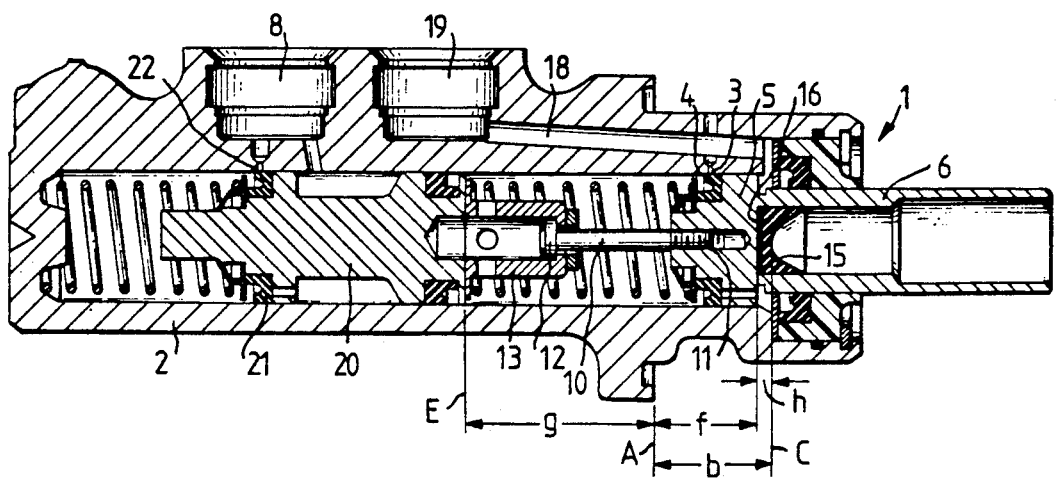

Assuming that, as shown in FIG. 4, the force acts upon the rear end of the first piston 5 in plane C, the distance of which from a predetermined reference plane A is a functional distance b, the force applying plane in the cup step 6, hence, will be shifted from plane B in FIG. 1 to plane C (see FIG. 3). This is done by suitable measures, for example, a number of spacer plates 16 (see FIG. 3) or a plug 15 of suitable height, is placed into the bottom of the cup step 6. Also, the two steps may be combined. With distance a, in FIG. 1, having been measured, distance f, under consideration of the lost travel, will be f=a+k. However, as the functional distance b is made a prerequisite, distance h to be filled up with the aid of spacer plates or the like, has the value h=b−f=b−a−k, thereby attaining that the first piston in the resting position, precisely has the desired lost travel k.

Figure 2:
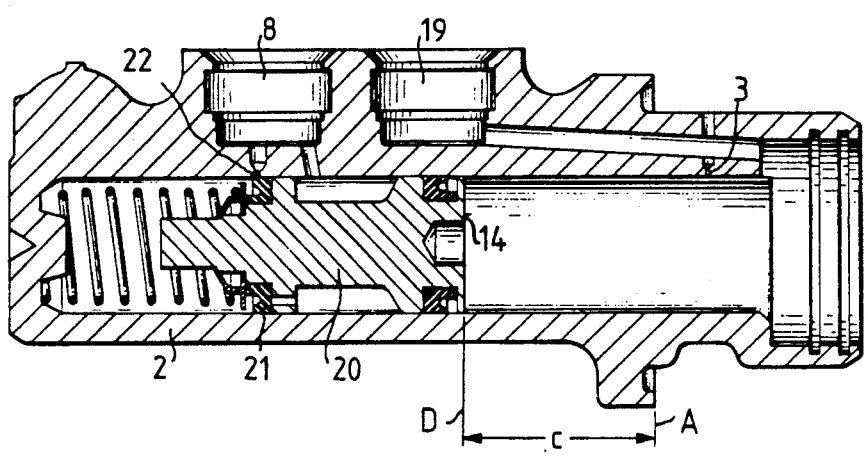
FIG. 2 shows a tandem cylinder according to FIG. 1 with the first piston removed.

In a tandem master cylinder of the type as shown in FIG. 4, provision also made for the second piston (frequently designated as an intermediate piston), in the resting position, exhibits the proper lost travel value. To insure this, steps initially are taken in analogy to those described in connection with the first piston in that the second piston 20 is placed into a position, for example by pressure measurements or, alternatively, by optical measurements, in which it just seals, by sleeve 21 thereof, the second equilibrium port 22. This adjustment is effected with the first piston (FIG. 3) as shown in FIG. 2. Now, the distance of the plane of abutment D on the second piston from the reference plane A on the housing 2 of the tandem cylinder 1 is measured which is assumed, as shown in FIG. 2, to have the distance c. Under consideration of a lost travel m for the second piston, the distance g from the rear face D of the second piston as shown in FIG. 2 to the reference plane A is then g=c−m.

As shown in FIG. 3, the first piston, through a cup 13, acts upon the rear face 14 of the second piston 20. The cup 13 is held in spaced relationship from the first piston 5 by means of a spring, with the piston 13, by means of a twisting set screw 10, being captivated by way of the first piston 5. As the front-sided top face E, at the same time, is the face of abutment of first piston 5 on second abutment piston 20, the distance of the cup 13 must be so adjust through the set screw such that, in the initial position of the tandem cylinder, the pistons are in the desired position under consideration of the provided lost travel, with the desired functional distance b being maintained at the same time as shown in FIG. 4. Assuming that, as shown in FIG. 4, the two pistons are in their resting position, taking into account the desired lost travel, the distance between the front end of cup 13

(plane E) and the rear plane of C within step 6 on the first piston, is g+b. This desired distance is designated by d as shown in FIG. 3. Hence, d=g+b. Concerning the process as employed, this will mean that, starting from plane C, the set screw 10 must be screwed out by an amount until distance d is reached, with d=c−m+b. As a rule, the lost travel k for the first piston 1 is selected to have the same size as the lost travel m of the second piston so that k=m, with this value preferably being 1 mm.

After adjustment of the proper distance d, the adjustment of the set screw 10 which, through its head 12 holds the cup 13 and is adjustable through screw 11 (see FIG. 3), is blocked. The adjusted first piston is pushed behind the second piston 20 into the cylindrical chamber 17. Subsequently, the corresponding sealants are inserted into the rear end of the housing 2.

What is claimed is:

1. A process for the precise adjustment of at least one piston (5) in a master cylinder (1) of a pressure fluid-actuated brake system for an automotive vehicle in which the piston (5) with a sealing cup (4), in the actuating direction of the push rod, is disposed ahead of an equilibrium port (3), wherein the piston (5), in the actuating direction, is displaced by an amount to just seal the equilibrium port (3) with its sealing cup (4), said process comprising the steps of: measuring in the displaced position of the piston (5) the distance (a) of the first plane of abutment (B) of the push rod on the piston (5) from a reference plane (A) on the master cylinder (1) housing and displacing the first plane of abutment (B) a predetermined functional distance (b) from the reference plane (A).

2. The process according to claim 1, wherein reaching of the sealing position (FIG. 1) of piston (5) is determined by measuring a change in pressure caused by closing the equilibrium port (3) by means of sealing cup (4).

3. The process according to claim 2, wherein the pressure drop in the cylindrical chamber (17) of the master cylinder (1) on an outlet port in the master cylinder (1) occurring by closing the equilibrium port (3) in communication with a pressure source, is measured as the pressure change.

4. The process according to claim 2, wherein the rise in pressure on the connecting path between the pressure source and the equilibrium port (3) occurring when closing the equilibrium port (3) in communication with a pressure source, is measured as the pressure change.

5. The process according to any one of claims 1 to 4, wherein a plug (15) of suitable dimensions is placed between push rod and original plane of abutment (B) of the push rod on the piston (5) for adjusting the predetermined distance (b, functional distance).

6. The process according to claim 5, wherein a second piston (20) with sleeve (21) thereof, in its actuating direction, is disposed to seal, with the sleeve (21) thereof, a second equilibrium port (22), wherein in this position of the second piston (20), the second distance (c) of the third plane of abutment (D, FIG. 2) on the second piston (20) from reference plane (A) on the master cylinder (1), is measured and, thereafter, the fourth plane of abutment (E) of the first piston (5) on the second piston (20), through suitable measures, in the direction of abutment, is displaced until the second distance (c) reduced by a predetermined lost travel (m) and increased by the functional distance (b) adjusted on the first piston (5) equals the distance of the second plane of abutment (C) from the fourth plane of abutment (E).

7. The process according to claim 6, wherein that the value selected for the lost travel (m) of the second piston (20) is equal to the value for the lost travel (k) of the first piston (5).

8. The process according to claim 7, wherein the lost travel (k, m) is 1 mm.

9. A process for the precise adjustment of the lost travel (k, m) of at least one piston (5) in a master cylinder (1) of a pressure fluid-actuated brake system for an automotive vehicle in which the piston (5) with a sealing cup (4), in the actuating direction of the push rod, is disposed ahead of an equilibrium port (3), wherein the piston (5), in the actuating direction, is displaced by an amount to just seal the equilibrium port (3) with its sealing cup (4), said process comprising the steps of: measuring in the displaced position of the piston (5) the distance (a) of the first plane of abutment (B) of the push rod on the piston (5) from a reference plane (A) on the master cylinder (1) housing and displacing the first plane of abutment (B) a predetermined functional distance (b) from the reference plane (A), wherein a plug (15) of suitable dimensions is placed between push rod and original plane of abutment (B) of the push rod on the piston (5) for adjusting the predetermined distance (b, functional distance), wherein a second piston (20) with sleeve (21) thereof, in its actuating direction, is disposed to seal, with the sleeve (21) thereof, a second equilibrium port (22), wherein in this position of the second piston (20), the second distance (c) of the third plane of abutment (D, FIG. 2) on the second piston (20) from reference plane (A) on the master cylinder (1), is measured and, thereafter, the fourth plane of abutment (E) of the first piston (5) on the second piston (20), through suitable measures, in the direction of abutment, is displaced until the second distance (c) reduced by a predetermined lost travel (m) and increased by the functional distance (b) adjusted on the first piston (5) equals the distance of the second plane of abutment (C) from the fourth plane of abutment (E), wherein that the value selected for the lost travel (m) of the second piston (20) is equal to the value for the lost travel (k) of the first piston (5), wherein the lost travel (k, m) is 1 mm, and wherein the fourth plane of abutment (E) is formed by the circumferential support face of a cup (13) resiliently supported on the front-sided end of the first piston (5), the distance of which cup from the first piston (5), through a set screw (10), is adjustably captivated.

* * * * *